(12) United States Patent
Chung et al.

(10) Patent No.: US 12,488,790 B2
(45) Date of Patent: Dec. 2, 2025

(54) SELF-SUPERVISED LEARNING METHOD BASED ON PERMUTATION INVARIANT CROSS ENTROPY AND ELECTRONIC DEVICE THEREOF

(71) Applicant: ELECTRONICS AND TELECOMMUNICATIONS RESEARCH INSTITUTE, Daejeon (KR)

(72) Inventors: Hoon Chung, Daejeon (KR); Byung Ok Kang, Daejeon (KR); Yoonhyung Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 280 days.

(21) Appl. No.: 18/350,111

(22) Filed: Jul. 11, 2023

(65) Prior Publication Data

US 2024/0105166 A1   Mar. 28, 2024

(30) Foreign Application Priority Data

Sep. 15, 2022   (KR) ........................ 10-2022-0116118

(51) Int. Cl.
*G10L 15/16*   (2006.01)
*G10L 15/06*   (2013.01)
*G10L 15/065*   (2013.01)

(52) U.S. Cl.
CPC ............ *G10L 15/16* (2013.01); *G10L 15/063* (2013.01); *G10L 15/065* (2013.01)

(58) Field of Classification Search
None
See application file for complete search history.

(56) References Cited

U.S. PATENT DOCUMENTS

| 9,959,862 | B2 | 5/2018 | Kang et al. |
| 10,249,294 | B2 | 4/2019 | Kim et al. |

(Continued)

FOREIGN PATENT DOCUMENTS

| KR | 10-2083938 B1 | 4/2020 |
| KR | 10-2177568 B1 | 11/2020 |
| KR | 20220128401 A | 9/2022 |

OTHER PUBLICATIONS

Hsu, Wei-Ning, et al. "Hubert: Self-supervised speech representation learning by masked prediction of hidden units." IEEE/ACM transactions on audio, speech, and language processing 29 (2021): 3451-3460. (Year: 2021).*

(Continued)

*Primary Examiner* — Douglas Godbold
(74) *Attorney, Agent, or Firm* — Rabin & Berdo, P.C.

(57) ABSTRACT

Provided is a self-supervised learning method based on permutation invariant cross entropy. A self-supervised learning method based on permutation invariant cross entropy performed by an electronic device includes: defining a cross entropy loss function for pre-training of an end-to-end speech recognition model; configuring non-transcription speech corpus data composed only of speech as input data of the cross entropy loss function; setting all permutations of classes included in the non-transcription speech corpus data as an output target and calculating cross entropy losses for each class; and determining a minimum cross entropy loss among the calculated cross entropy losses for each class as a final loss.

12 Claims, 5 Drawing Sheets

(56) References Cited

U.S. PATENT DOCUMENTS

| | | |
|---|---|---|
| 2018/0068652 A1 | 3/2018 | Yong et al. |
| 2021/0312294 A1* | 10/2021 | Kurata ................... G06F 18/24 |
| 2021/0312905 A1* | 10/2021 | Zhao ....................... G10L 15/16 |
| 2022/0093083 A1 | 3/2022 | Kurata et al. |
| 2022/0254352 A1* | 8/2022 | Fujita ..................... G10L 17/18 |
| 2023/0103722 A1* | 4/2023 | Rosenberg ............ G10L 15/063 |
| | | 704/240 |
| 2023/0104228 A1* | 4/2023 | Li .......................... G06N 3/045 |
| | | 704/232 |
| 2023/0298572 A1* | 9/2023 | Kim ....................... G06F 18/22 |
| | | 704/232 |

OTHER PUBLICATIONS

Tjandra, Andros, et al. "Improved language identification through cross-lingual self-supervised learning." ICASSP 2022-2022 IEEE International Conference on Acoustics, Speech and Signal Processing (ICASSP). IEEE, 2022. (Year: 2022).*

Kahn, Jacob, Ann Lee, and Awni Hannun. "Self-training for end-to-end speech recognition." ICASSP 2020-2020 IEEE International Conference on Acoustics, Speech and Signal Processing (ICASSP). IEEE, 2020. (Year: 2020).*

Chung, Hoon, Hyeong-Bae Jeon, and Jeon Gue Park. "Semi-supervised training for sequence-to-sequence speech recognition using reinforcement learning." 2020 international joint conference on neural networks (IJCNN). IEEE, 2020. (Year: 2020).*

* cited by examiner

SELF-SUPERVISED LEARNING METHOD BASED ON PERMUTATION INVARIANT CROSS ENTROPY AND ELECTRONIC DEVICE THEREOF

BACKGROUND

1. Field of the Invention

The present invention relates to a self-supervised learning method based on permutation invariant cross entropy and an electronic device thereof.

2. Discussion of Related Art

End-to-end speech recognition technology is one of the speech recognition technologies with a high rate of success in speech recognition, and is a field that is being actively researched recently. Meanwhile, a learning method of an end-to-end speech recognition model may be largely classified into supervised learning, semi-supervised learning, and unsupervised learning. The supervised learning is a method of learning the relationship between input and output values when input data and corresponding output value pairs are given, and the unsupervised learning is a method of learning an intrinsic structure of input data when only input data is given. The semi-supervised learning is an intermediate form between the supervised learning and the unsupervised learning. When there is only transcription of output values for some input data, the relationship between the input and output is learned with transcription data and the model is made robust with non-transcription data.

In this case, the end-to-end speech recognition model trained by the supervised learning method has the advantage of showing good performance, but in order to advance the model, a large amount of transcription data should be built, which requires a lot of cost and effort.

SUMMARY OF THE INVENTION

The present invention has been proposed to solve the above problems, and provides a self-supervised learning method based on permutation invariant cross entropy and an electronic device thereof capable of acquiring a pre-training model more suitable for a classifier in a pre-training step by learning an inherent expression of speech using only non-transcription speech corpus data in learning of a deep neural network-based end-to-end speech recognition model.

However, the problems to be solved by the present invention are not limited to the problems described above, and other problems may be present.

According to an embodiment of the present invention, a self-supervised learning method based on permutation invariant cross entropy performed by an electronic device includes: defining a cross entropy loss function for pre-training of an end-to-end speech recognition model; configuring non-transcription speech corpus data composed only of speech as input data of the cross entropy loss function; setting all permutations of classes included in the non-transcription speech corpus data as an output target and calculating cross entropy losses for each class; and determining a minimum cross entropy loss among the calculated cross entropy losses for each class as a final loss.

According to another embodiment of the present invention, an electronic device for self-supervised learning based on permutation invariant cross entropy includes: a memory configured to store a program for the self-supervised learning based on permutation invariant cross entropy; and a processor configured to execute the program stored in the memory. As the processor executes the program, the processor configures non-transcription speech corpus data composed only of speech as input data of a cross entropy loss function defined for pre-training of an end-to-end speech recognition model, and then sets all permutations of classes included in the non-transcription speech corpus data as an output target to calculate cross entropy losses for each class and determines a minimum cross entropy loss among the calculated cross entropy losses for each class as a final loss.

A computer program according to another aspect of the present invention for solving the above problems executes the self-supervised learning method based on permutation invariant cross entropy and is stored in a computer-readable recording medium.

Other specific details of the invention are included in the detailed description and drawings.

DETAILED DESCRIPTION OF EXEMPLARY EMBODIMENTS

Various advantages and features of the present invention and methods accomplishing them will become apparent from the following description of embodiments with reference to the accompanying drawings. However, the present disclosure is not limited to embodiments to be described below, but may be implemented in various different forms, these embodiments will be provided only in order to make the present disclosure complete and allow those skilled in the art to completely recognize the scope of the present disclosure, and the present disclosure will be defined by the scope of the claims.

Terms used in the present specification are for explaining embodiments rather than limiting the present disclosure. Unless otherwise stated, a singular form includes a plural form in the present specification. Throughout this specification, the term "comprise" and/or "comprising" will be understood to imply the inclusion of stated constituents but not the exclusion of any other constituents. Like reference numerals refer to like components throughout the specification and "and/or" includes each of the components mentioned and includes all combinations thereof. Although "first," "second," and the like are used to describe various components, it goes without saying that these components are not limited by these terms. These terms are used only to distinguish one component from other components. Therefore, it goes without saying that the first component mentioned below may be the second component within the technical scope of the present invention.

Unless defined otherwise, all terms (including technical and scientific terms) used in the present specification have the same meanings commonly understood by those skilled in the art to which the present invention pertains. In addition, terms defined in commonly used dictionary are not ideally or excessively interpreted unless explicitly defined otherwise.

Hereinafter, the background to which the present invention was conceived will be described to help those skilled in the art understand, and then the present invention will be described in detail.

An end-to-end speech recognition model is a posterior probability model P(y|x) that will output a correct symbol for an input speech signal x. In general, the end-to-end speech recognition model is trained with a supervised learning method that minimizes cross entropy loss as shown in [Equation 1].

$$l_n = -\sum_{c=1}^{C} \log\left(P\left(y=c|x_n\right)\right) y_{n,c} \quad \text{[Equation 1]}$$

In this case, in [Equation 1], C denotes the number of all classes, and $y_{n,c}$ denotes probabilities of each class for an n-th input speech signal $x_n$.

Meanwhile, a large amount of transcription speech data is required to advance the end-to-end speech recognition model, but a transcription operation requires a lot of efforts and costs. As the method of reducing these efforts and costs, methods for enhancing an end-to-end speech recognition model using only non-transcription speech data are attracting much attention.

Among the methods using only the non-transcription speech data, the most representative method includes a self-training method and a self-supervised learning method.

The self-learning method generates a pseudo-level $$\hat{y}_n^* = \underset{y}{\operatorname{argmax}} P\left(y|x_n\right)$$

for the speech data $x_n$ and trains by a supervised learning method of creating a (speech, transcription) pair $(x_n, \hat{y}_n^*)$ to minimize the cross entropy loss function of [Equation 1].

On the other hand, the self-supervised learning method is a method of learning an expression inherent in the speech signal, and learns by defining a loss function for a specific purpose, which is called pre-training. However, in order to use the pre-trained model for speech recognition, it goes through a supervised learning process that minimizes the cross entropy loss function of [Equation 1] for a certain amount of (speech, transcription) corpus, which is called fine-tuning.

There are various methods for self-supervised learning, and the most widely used methods are a wav2vec method and a vq-wav2vec method.

Figure 1:
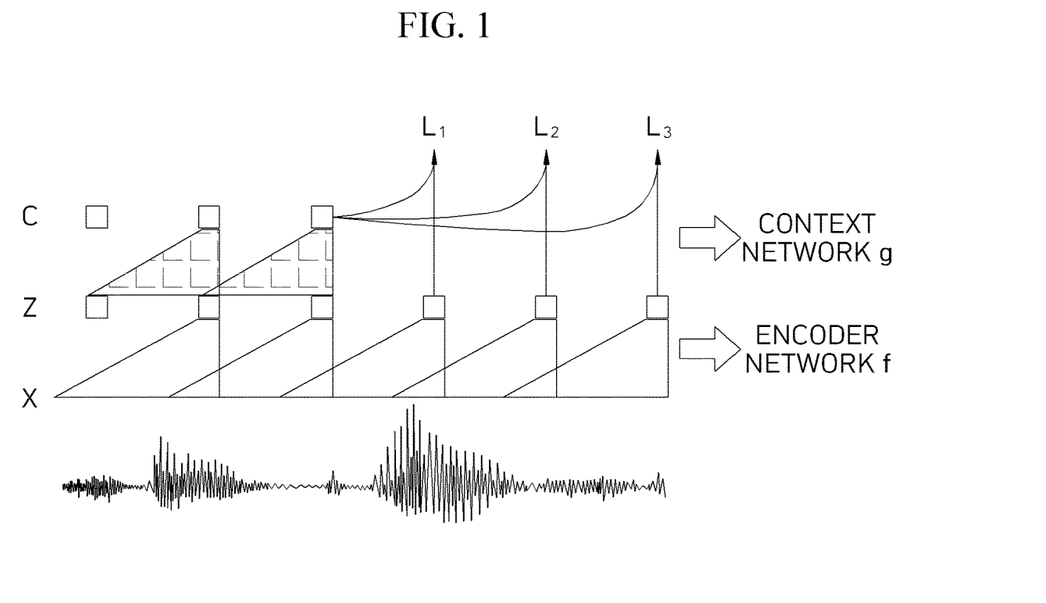
FIG. 1 is a diagram for describing a wav2vec method.

FIG. 1 is a diagram for describing a wav2vec method.

In the case of the wav2vec method, an encoder network f converts input speech data X into latent expression Z, and a context network g converts latent expression Z into context expression C.

The wav2vec is learned through a process of binary classification whether the corresponding input is a positive pair or a negative pair, as shown in [Equation 2]. In this case, the positive pair is composed of i-th context expression $C_i$ and i+1-th latent expression $Z_{i+1}$ of the input speech data. The negative pair is configured by randomly extracting the i-th context expression $C_i$ of the input speech data and potential expressions of other speech in the current arrangement.

$$\mathcal{L}_k = -\sum_{i=1}^{T-k}\left(\log \sigma\left(z_{i+k}^T h_k(c_i)\right) + \lambda \underset{\tilde{z}\sim p_n}{\mathbb{E}}\left[\log \sigma\left(-\tilde{z}^T h_k(c_i)\right)\right]\right) \quad \text{[Equation 2]}$$

Figure 2:
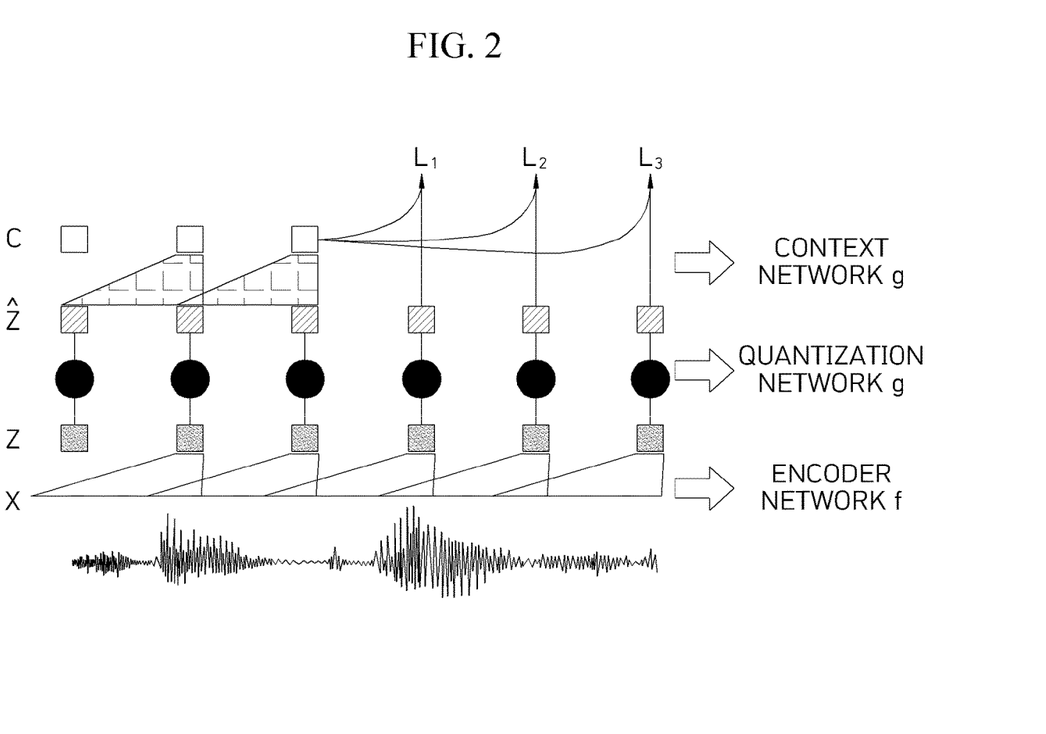
FIG. 2 is a diagram for describing a vq-wav2vec method.

FIG. 2 is a diagram for describing a vq-wav2vec method.

Thereafter, the vq-wav2vec method, which is an improvement of the wav2vec method, has a quantization module added to the wav2vec structure as illustrated in FIG. 2. In this case, the quantization module q quantizes continuous expression Z, and converts the continuous expression Z into $\hat{Z}$. Meanwhile, the loss function of the wq-wav2vec is the same as [Equation 2].

These conventional methods are trained to minimize the loss function of Equation 2 for a corpus composed only of speech in the pre-training step, and train to minimize the loss function of Equation 1 for a corpus composed of speech and transcription data in the fine-tuning step. In this way, it can be seen that the purpose of the pre-training step and the fine-tuning step are different.

The self-supervised learning method based on permutation invariant cross entropy and the electronic device 100 thereof according to an embodiment of the present invention match an objective function between the pre-training step and the fine-tuning step that occur in conventional methods to perform the fine-tuning step already in mind in the pre-training step.

Therefore, in one embodiment of the present invention, a permutation invariant cross entropy (PICE) method is proposed to use the cross entropy loss function as shown in Equation 1 as a loss function for training the non-transcription speech corpus data composed only of speech.

Hereinafter, an electronic device 100 for self-supervised learning based on the permutation invariant cross entropy according to an embodiment of the present invention will be described with reference to FIG. 3.

Figure 3:
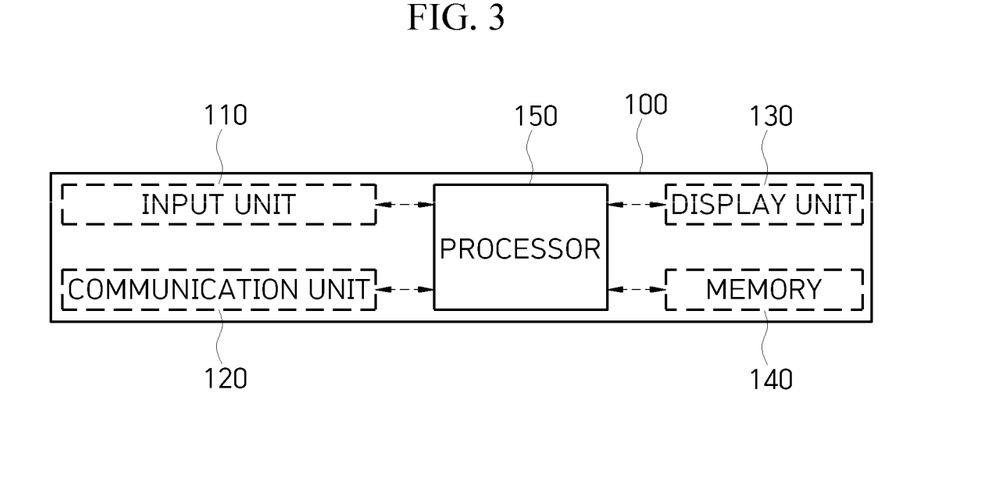
FIG. 3 is a diagram for describing an electronic device according to an embodiment of the present disclosure.

FIG. 3 is a diagram for describing an electronic device 100 according to an embodiment of the present invention.

The electronic device 100 according to the embodiment of the present invention includes an input unit 110, a communication unit 120, a display unit 130, a memory 140, and a processor 150.

The input unit 110 generates input data in response to a user input of the electronic device 100. The user input may include the user input related to data that the electronic device 100 intends to process.

The input unit 110 includes at least one input means. The input unit 110 may include a keyboard, a key pad, a dome switch, a touch panel, a touch key, a mouse, a menu button, and the like.

The communication unit 120 serves to transmit and receive data between internal components or communicate with an external device such as an external server. The communication unit 120 may include both a wired communication module and a wireless communication module. The wired communication module may be implemented as a power line communication device, a telephone line communication device, cable home (MoCA), Ethernet, IEEE1294, an integrated wired home network, and an RS-485 control device. In addition, the wireless communication module may be configured in a module for implementing functions such as wireless LAN (WLAN), Bluetooth, HDR WPAN, UWB, ZigBee, Impulse Radio, 60 GHz WPAN, Binary-CDMA, wireless USB technology and wireless HDMI technology, 5th (5G) generation communication, long term evolution-advanced (LTE-A), long term evolution (LTE), and wireless fidelity (Wi-Fi).

The display unit 130 displays display data according to the operation of the electronic device 100. The display unit 130 may display a visualization result of speech data, a cross entropy loss calculation result, a final loss calculation result, a class distribution, and the like.

The display unit 130 may include a liquid crystal display (LCD), a light emitting diode (LED) display, an organic LED (OLED) display, a micro electro mechanical systems (MEMS) display, and an electronic paper display. The display unit 130 may be coupled with the input unit 110 and implemented as a touch screen.

The memory 140 stores programs for self-supervised learning based on permutation invariant cross entropy. Here, the memory 140 collectively refers to a non-volatile storage device that continuously maintains stored information even when power is not supplied and a volatile storage device. For example, the memory 140 may include NAND flash memories such as a compact flash (CF) card, a secure digital (SD) card, a memory stick, a solid-state drive (SSD), and a micro SD card, magnetic computer storage devices such as a hard disk drive (HDD), and optical disc drives such as CD-ROM and DVD-ROM.

The processor 150 may execute software such as a program to control at least one other component (e.g., hardware or software component) of the electronic device 100, and may perform various data processing or calculations.

The processor 150 may configure non-transcription speech corpus data as input data of the defined cross entropy loss function, and calculate cross entropy loss based on the configured non-transcription speech corpus data.

Hereinafter, the self-supervised learning method based on permutation invariant cross entropy performed by the electronic device 100 will be described with reference to FIG. 4.

Figure 4:
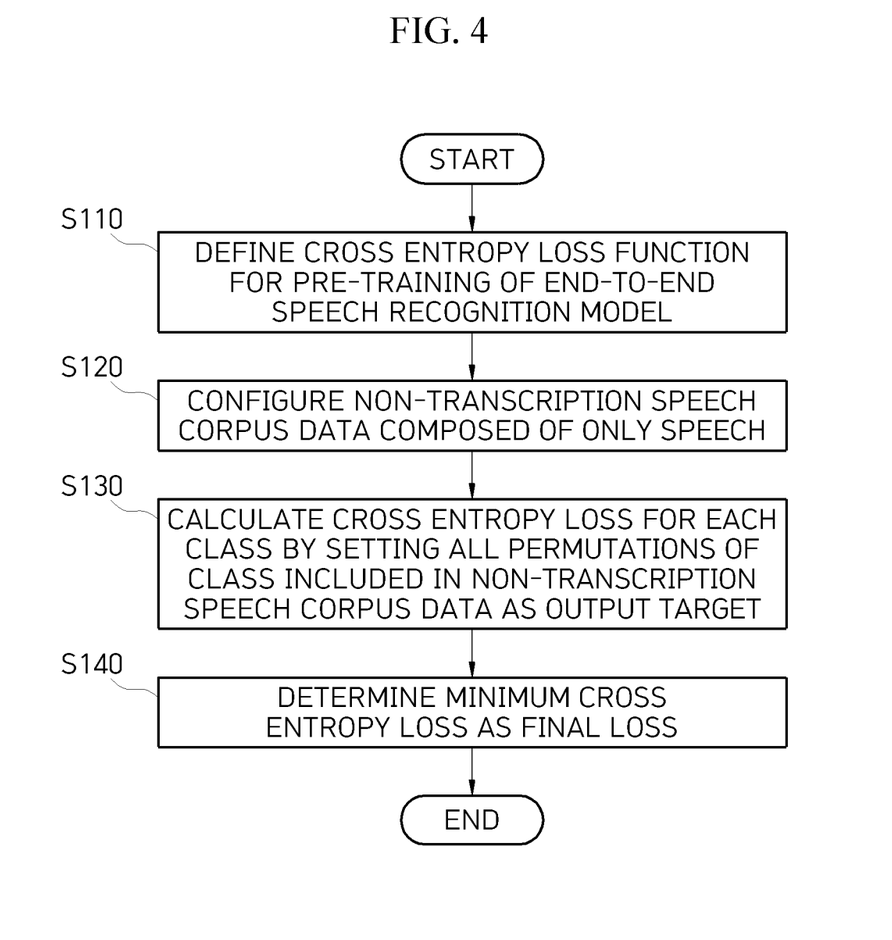
FIG. 4 is a flowchart of a self-supervised learning method according to an embodiment of the present invention.

FIG. 4 is a flowchart of a self-supervised learning method according to an embodiment of the present invention.

First, the processor 150 defines a cross entropy loss function for pre-training of an end-to-end speech recognition model (S110), and configures non-transcription speech corpus data composed of only speech as the input data of the cross entropy loss function (S120).

In one embodiment, the processor 150 converts probabilities $y_{n,c}$ for each class for n-th speech data $x_n$ of the non-transcription speech corpus data input to the end-to-end speech recognition model into a one-hot vector to define a cross entropy loss function defined as shown in Equation 3 below.

$$l_n = -\log(P(y=y_n|x_n)) \quad \text{[Equation 3]}$$

In this case, in Equation 3 above, P(y|x) denotes a posterior probability of outputting a correct symbol for the input speech data x.

In general, in deep neural network model training, input data is grouped into N pieces to form a mini-batch, and the input data is processed in mini-batch units. Based on this, the processor may define the cross entropy loss function defined as shown in Equation 4 as non-transcription speech data is composed of mini-batch units including N speech data.

$$l(x, y) = \sum_{n=1}^{N} -\log P(y = y_n | x_n) \quad \text{[Equation 4]}$$

In this case, in Equation 4, $x_n$ denotes the n-th speech data, and $y_n$ denotes the correct symbol. In the present invention, a method of training with cross entropy when only the speech data $x_n$ exists without the correct symbol $y_n$ will be described.

To this end, an embodiment of the present invention may set the following two assumptions.

(1) Non-transcription speech corpus data composed only of speech has N classes, and the distribution of each class is uniform.

(2) A mini-batch is composed of randomly sampled N speech data.

Such an assumption sets a limiting condition that the speech data constituting a mini-batch belong to different classes, and this assumption is applied in the present invention.

Next, the processor 150 sets all the permutations of the classes included in the non-transcription speech corpus data as output targets, calculates the cross entropy losses for each class (S130), and determines the minimum cross entropy loss among the calculated cross entropy losses for each class as the final loss (S140).

As an example, assuming that each class for a non-transcriptional speech corpus composed of a first speech corpus $x_0$ and a second speech corpus $x_1$ is two (A and B) for intuitive understanding, a mini-batch configured according to random sampling becomes $B_0=(x_0, x_1)$ or $B_1=(x_1, x_0)$. The corresponding correct symbol is either $(y_0, y_1)$ or $(y_1, y_0)$. However, in this case, it may not be known whether the mini-batch is $B_0$ or $B_1$.

Accordingly, the processor 150 considers all the permutations of the class as the output targets and measures individual cross entropy losses $L_{\pi_0}, L_{\pi_1}$ as shown in Equation 5. The processor may determine the minimum cross entropy loss among the measured individual cross entropy losses as the final loss. According to this method, it is possible to train to minimize the cross entropy loss function even for speech data without transcription.

$$L = \min(L_{\pi_0}, L_{\pi_1}) \quad \text{[Equation 5]}$$

$$L_{\pi_0} = -\log P(y=A|x_0) - \log P(y=B|x_1)$$

$$L_{\pi_1} = -\log P(y=B|x_0) - \log P(y=A|x_1)$$

By generalizing Equation 5, the permutation invariant cross entropy loss function proposed in the present invention may be obtained as shown in Equation 6.

$$L = \min_{\pi_p \in P} \sum_{n=1}^{N} -\log P\left(y = y_{\pi_p(n)} | x_n\right), |P| = N! \quad \text{[Equation 6]}$$

That is, the minimum cross entropy loss among the cross entropy losses for each class calculated to correspond to N possible permutations P according to a configuration of a mini-batch unit including N speech data may be determined as a final loss.

In this case, in Equation 6 above, $\pi_p$ denotes one element constituting the N possible permutations P.

Meanwhile, in the above description, steps S110 to S140 may be further divided into additional steps or combined into fewer operations according to an implementation example of the present invention. Also, some steps may be omitted if necessary, and an order between the operations may be changed. In addition, even if other contents are omitted, the contents described in FIG. 3 and the contents described in FIG. 4 may be mutually applied.

Hereinafter, the operation results of the self-supervised learning method according to the present invention will be described with reference to FIGS. 5A to 5C.

According to an embodiment of the present invention, by training a deep neural network model as if transcription information exists for speech data without non-transcription, it is possible to acquire a pre-training model more suitable for a classifier in a pre-training step.

Figure 5A:
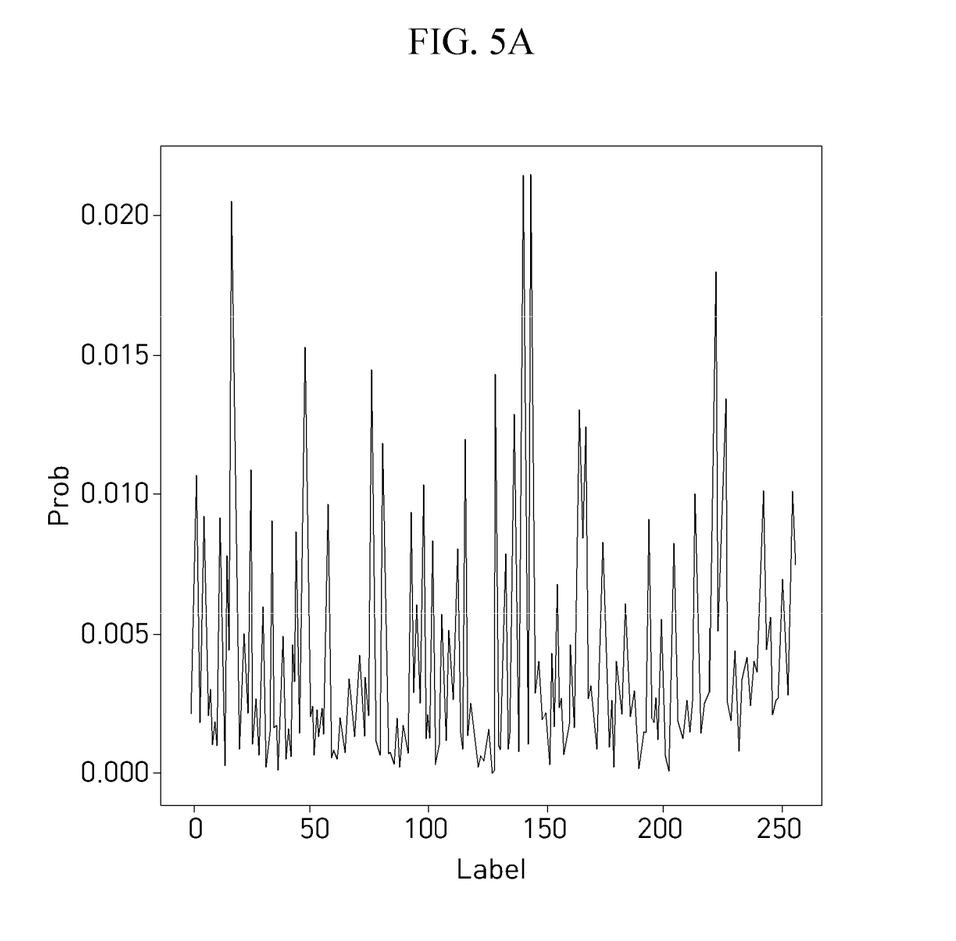
FIGS. 5A to 5C are diagrams for describing operation results of a self-supervised learning method according to an embodiment of the present invention.
Figure 5B:
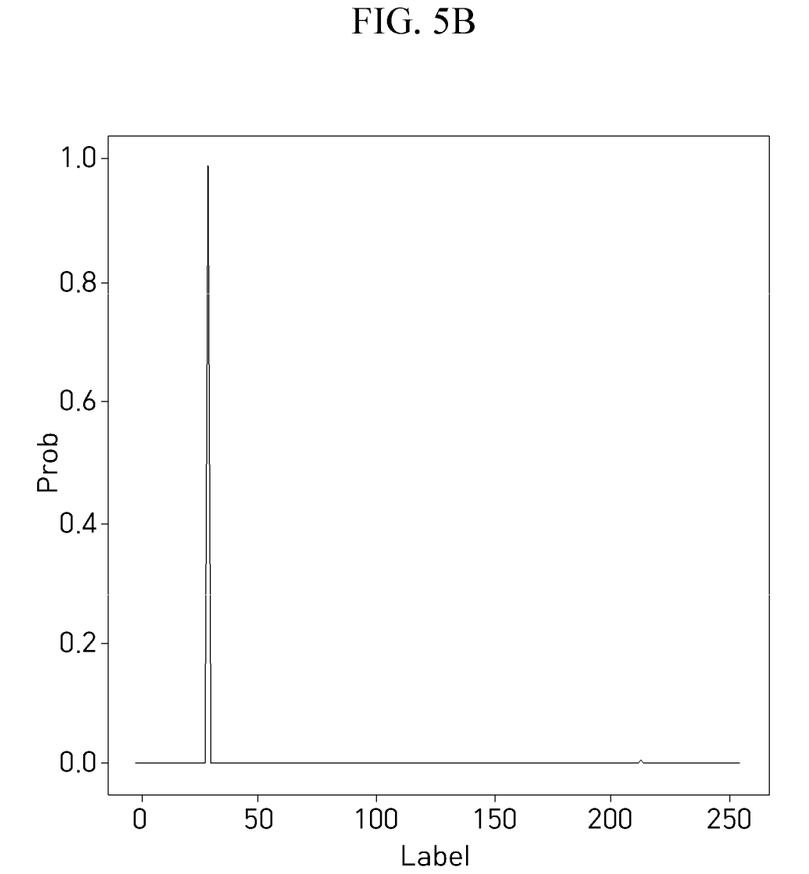
Figure 5C:
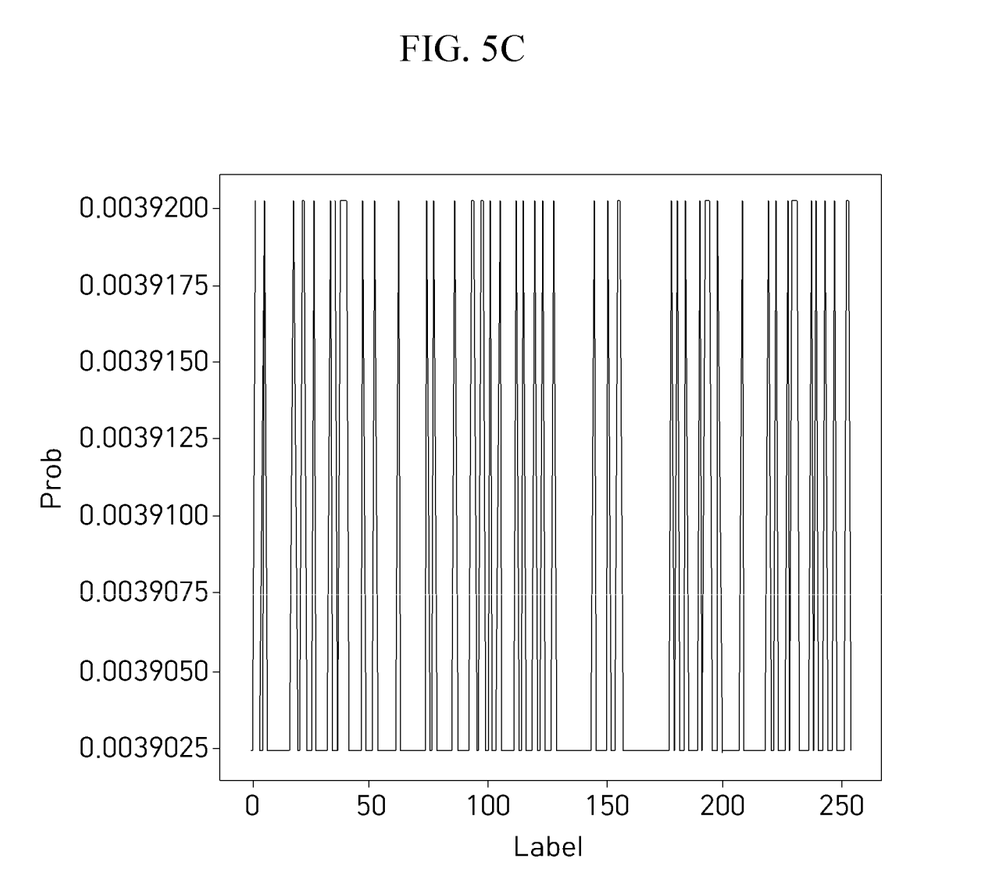

FIG. 5A shows the distribution of the correct classes, and the result of the end-to-the end speech recognition model learned through the pre-training aims to finally be the same as that of FIG. 5A. It may be confirmed through FIG. 5B that, as a result of training with the self-learning method according to the conventional method, a constant value problem in which an output value is output in one distribution occurs. In contrast, according to an embodiment of the present invention, it can be confirmed that a tendency to follow the distribution of the correct answer classes is shown as illustrated in FIG. 5C.

The self-supervised learning method based on permutation invariant cross entropy according to the embodiment of the present invention described above may be implemented as a program (or application) and stored in a medium to be executed in combination with a computer that is hardware.

In order for the computer to read the program and execute the methods implemented as the program, the program may include a code coded in a computer language such as C, C++, JAVA, Ruby, or machine language that the processor (CPU) of the computer may read through a device interface of the computer. Such code may include functional code related to a function or such defining functions necessary for executing the methods and include an execution procedure related control code necessary for the processor of the computer to execute the functions according to a predetermined procedure. In addition, the code may further include a memory reference related code for which location (address street number) in an internal or external memory of the computer the additional information or media necessary for the processor of the computer to execute the functions is to be referenced at. In addition, when the processor of the computer needs to communicate with any other computers, servers, or the like located remotely in order to execute the above functions, the code may further include a communication-related code for how to communicate with any other computers, servers, or the like using the communication module of the computer, what information or media to transmit/receive during communication, and the like.

The storage medium is not a medium that stores images therein for a while, such as a register, a cache, a memory, or the like, but means a medium that semi-permanently stores the images therein and is readable by an apparatus. Specifically, examples of the storage medium include, but are not limited to, ROM, random-access memory (RAM), CD-ROM, a magnetic tape, a floppy disk, an optical image storage device, and the like. That is, the program may be stored in various recording media on various servers accessible by the computer or in various recording media on the computer of the user. In addition, media may be distributed in a computer system connected by a network, and a computer-readable code may be stored in a distributed manner.

According to an embodiment of the present invention, by training a deep neural network model as if transcription information exists for speech data without non-transcription, it is possible to acquire a pre-training model more suitable for a classifier in a pre-training step.

The effects of the present invention are not limited to the above-described effects, and other effects that are not mentioned may be obviously understood by those skilled in the art from the following description.

The above description of the present invention is for illustrative purposes, and those skilled in the art to which the present invention pertains will understand that it may be easily modified to other specific forms without changing the technical spirit or essential features of the present invention. Therefore, it should be understood that the above-mentioned exemplary embodiments are exemplary in all aspects but are not limited thereto. For example, each component described as a single type may be implemented in a distributed manner, and similarly, components described as distributed may be implemented in a combined form.

It is to be understood that the scope of the present invention will be defined by the claims rather than the above-described description and all modifications and alternations derived from the claims and their equivalents are included in the scope of the present invention.

What is claimed is:

1. A self-supervised learning method based on permutation invariant cross entropy performed by an electronic device, the self-supervised learning method comprising:
   defining a cross entropy loss function for pre-training of an end-to-end speech recognition model;
   configuring non-transcription speech corpus data composed only of speech as input data of the cross entropy loss function;
   setting all permutations of classes included in the non-transcription speech corpus data as an output target and calculating cross entropy losses for each class;
   determining a minimum cross entropy loss among the calculated cross entropy losses for each class as a final loss; and
   training the end-to-end speech recognition model based on at least the determined final loss to use the end-to-end speech recognition model to recognize speech;
   wherein the defining of the cross entropy loss function for pre-training of the end-to-end speech recognition model includes:
   converting probabilities $y_{n,c}$ for each class for n-th speech data $x_n$ of the non-transcription speech corpus data input to the end-to-end speech recognition model into a one-hot vector; and
   defining the cross entropy loss function by Equation 1 below according to the conversion into the one-hot vector:

$$l_n = -\log P(y=y_n|x_n) \quad \text{[Equation 1]}$$

wherein $P(y=y_n|x_n)$ denotes a posterior probability of outputting a correct symbol for the input speech data $x_n$.

2. The self-supervised learning method of claim 1, wherein, in the configuring of the non-transcription speech corpus data composed only of speech as the input data of the cross entropy loss function, the non-transcription speech corpus data is grouped into N speech data and configured in mini-batch units.

3. The self-supervised learning method of claim 2, wherein, in the defining of the cross entropy loss function for pre-training of the end-to-end speech recognition model, the cross entropy loss function is further defined by Equation 2 below and is generated as the non-transcription speech corpus data, the non-transcription speech corpus data being composed of mini-batch units including N speech data;

$$l(x, y) = \sum_{n=1}^{N} -\log P(y = y_n | x_n).$$ [Equation 2]

4. The self-supervised learning method of claim 2, wherein, in the configuring of the non-transcription speech corpus data composed only of speech as the input data of the cross entropy loss function, a mini-batch is composed of randomly sampled N pieces of voice data.

5. The self-supervised learning method of claim 2, wherein, in the configuring of the non-transcription speech corpus data composed only of speech as the input data of the cross entropy loss function, the non-transcription speech corpus data includes N classes having a same distribution.

6. The self-supervised learning method of claim 2, wherein, in the setting of all the permutations of the classes included in the non-transcription speech corpus data as the output target and calculating the cross entropy losses for each class, the cross entropy losses $L_{\pi_0}$, $L_{\pi_1}$ for each class A and B for the non-transcription speech corpus data, the non-transcription speech corpus data being composed of first and second speech corpuses $x_0$ and $x_1$, is calculated through Equation 3 below:

$$L_{\pi_0} = -\log P(y=A|x_0) - \log P(y=B|x_1)$$

$$L_{\pi_1} = -\log P(y=B|x_0) - \log P(y=A|x_1).$$ [Equation 3]

7. The self-supervised learning method of claim 6, wherein, in the determining of the minimum cross entropy loss among the calculated cross entropy losses for each class as the final loss, the minimum cross entropy loss among the cross entropy losses for each class calculated to correspond to a number of N possible permutations P according to the configuration of the mini-batch units including the N speech data is determined as the final loss according to Equation 4 below $$L = \min_{\pi_p \in P} \sum_{n=1}^{N} -\log P\left(y = y_{\pi_p(n)} | x_n\right), |P| = N!$$ [Equation 4]

wherein $\pi_p$ denotes one element constituting the N possible permutations P.

8. An electronic device for self-supervised learning based on permutation invariant cross entropy, the electronic device comprising:
  a memory configured to store a program for the self-supervised learning based on permutation invariant cross entropy; and
  a processor configured to execute the program stored in the memory,
  wherein, as the processor executes the program, the processor configures non-transcription speech corpus data composed only of speech as input data of a cross entropy loss function defined for pre-training of an end-to-end speech recognition model, and then sets all permutations of classes included in the non-transcription speech corpus data as an output target to calculate cross entropy losses for each class, determines a minimum cross entropy loss among the calculated cross entropy losses for each class as a final loss, and trains the end-to-end speech recognition model based on at least the determined final loss to use the end-to-end speech recognition model to recognize speech;
  wherein the processor converts probabilities for each class for n-th speech data $x_n$ of the non-transcription speech corpus data input to the end-to-end speech recognition model into a one-hot vector to define a cross entropy loss function as shown in Equation 1 below:

$$l_n = -\log P(y=y_n|x_n)$$ [Equation 1]

wherein $P(y=y_n|x_n)$ denotes a posterior probability of outputting a correct symbol for the input speech data $x_n$.

9. The electronic device of claim 8, wherein the processor randomly samples the non-transcription speech corpus data, the non-transcription speech corpus data including N classes having a same distribution to generate a mini-batch including N speech data.

10. The electronic device of claim 9, wherein the processor further generates the cross entropy loss function defined by Equation 2 below as the non-transcription speech corpus data, the non-transcription speech corpus data being composed of mini-batch units including N speech data:

$$l(x, y) = \sum_{n=1}^{N} -\log P(y = y_n | x_n).$$ [Equation 2]

11. The electronic device of claim 9, wherein the processor calculates the cross entropy losses $L_{\pi_0}$, $L_{\pi_1}$ for each class A and B for the non-transcription speech corpus data, the non-transcription speech corpus data being composed of first and second speech corpuses $x_0$ and $x_1$, through Equation 3 below:

$$L_{\pi_0} = -\log P(y=A|x_0) - \log P(y=B|x_1)$$

$$L_{\pi_1} = -\log P(y=B|x_0) - \log P(y=A|x_1).$$ [Equation 3]

12. The electronic device of claim 11, wherein the processor determines the minimum cross entropy loss among the cross entropy losses for each class calculated to correspond to a number of N possible permutations P according to a configuration of a mini-batch unit including the N speech data as the final loss according to Equation 4 below:

$$L = \min_{\pi_p \in P} \sum_{n=1}^{N} -\log P\left(y = y_{\pi_p(n)} | x_n\right), |P| = N!$$ [Equation 4]

wherein $\pi_p$ denotes one element constituting the N possible permutations P.

* * * * *